(12) United States Patent
Noda

(10) Patent No.: US 8,923,589 B2
(45) Date of Patent: Dec. 30, 2014

(54) APPARATUS, METHOD, AND NON-TRANSITORY STORAGE MEDIUM FOR PERFORMING TOMOSYNTHESIS FROM PROJECTION DATA OBTAINED FROM DIFFERENT GEOMETRIC ARRANGEMENTS

(75) Inventor: Takeshi Noda, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 510 days.

(21) Appl. No.: 13/290,227

(22) Filed: Nov. 7, 2011

(65) Prior Publication Data

US 2012/0128225 A1 May 24, 2012

(30) Foreign Application Priority Data

Nov. 22, 2010 (JP) .................................. 2010-260367
Oct. 25, 2011 (JP) .................................. 2011-234148

(51) Int. Cl.
  *G06T 11/00* (2006.01)
(52) U.S. Cl.
  CPC ......... *G06T 11/006* (2013.01); *G06T 2211/436* (2013.01)
  USPC ........................................................ 382/131
(58) Field of Classification Search
  CPC ............... G06T 11/003; G06T 11/006; G06T 2207/10072; G06T 2207/10081; G06T 2211/421; G06T 2211/436; A61B 6/027; A61B 6/03; A61B 6/032; A61B 6/4085
  USPC ............. 382/128, 131; 378/10, 11, 14, 25, 26
  See application file for complete search history.

(56) References Cited

U.S. PATENT DOCUMENTS

| | | | |
|---|---|---|---|
| 6,256,370 B1 | 7/2001 | Yavuz | 378/22 |
| 6,442,288 B1 | 8/2002 | Haerer et al. | 382/128 |
| 2005/0226362 A1 | 10/2005 | Hinshaw | 378/8 |
| 2007/0036418 A1 | 2/2007 | Pan et al. | 382/131 |
| 2007/0116175 A1 | 5/2007 | Zhang et al. | 378/21 |
| 2010/0189214 A1 | 7/2010 | Shibata et al. | 378/21 |
| 2011/0158550 A1 | 6/2011 | Noda | 382/264 |

FOREIGN PATENT DOCUMENTS

| | | | |
|---|---|---|---|
| EP | 1 077 430 A2 | 2/2001 | G06T 11/00 |
| JP | 3878788 B2 | 2/2007 | A61B 6/03 |
| KR | 10-2009-0017657 A | 2/2009 | A61B 6/02 |

OTHER PUBLICATIONS

L.A. Feldkamp et. al., "Practical Cone-Beam Algorithm", *J. Opt. Soc. Am. A.*, vol. 1, No. 6, pp. 612-619 (1984).
J. Hsieh, *Computed Tomography: Principles, Design, Artifacts, and Recent Advances*, SPIE Press Monograph, vol. PM114, pp. 46-98, SPIE Publications (Feb. 18, 2003).
Mertelmeier, T. et al., "Optimizing Filtered Backprojection Reconstruction for a Breast Tomosynthesis Prototype Device", Proc. of SPIE, vol. 6142, pp. 6142F-1-6142F-12 (2006).

(Continued)

*Primary Examiner* — Andrew W Johns
(74) *Attorney, Agent, or Firm* — Fitzpatrick, Cella, Harper & Scinto

(57) ABSTRACT

An image processing apparatus which processes an image obtained by tomosynthesis shooting by using a radiation source and a two-dimensional detector. The image processing apparatus includes an obtaining unit configured to obtain a plurality of projection data output from the two-dimensional detector upon tomosynthesis shooting; and a reconstruction unit configured to perform analytical reconstruction processing of a tomogram of a subject from the plurality of projection data obtained by tomosynthesis shooting without transforming the projection data into virtual projection data on a virtual CT detection plane virtually set to be perpendicular to a radiation center direction of the radiation source.

22 Claims, 6 Drawing Sheets

(56) References Cited

OTHER PUBLICATIONS

Wu, T. et al., "A Comparison of Reconstruction Algorithms for Breast Tomosynthesis", Medical Physics, vol. 31, No. 9, pp. 2636-2647 (2004).

Office Action issued in Chinese Application No. 201110380757.4 dated Jan. 23, 2014.

Extended Search Report dated Mar. 1, 2012, issued on the corresponding European Patent Application No. 11008737.6.

M.M. Seger et al., "Scanning of Logs with Linear Cone-Beam Tomography", *Computers and Electronics in Agriculture*, vol. 41, pp. 45-62 (2003), XP007909039.

E.Y. Sidky et al., "Volume Image Reconstruction from a Straight-Line Source Trajectory", *IEEE Nuclear Science Symposium*, pp. 2441-2444 (2005), XP010896096.

APPARATUS, METHOD, AND NON-TRANSITORY STORAGE MEDIUM FOR PERFORMING TOMOSYNTHESIS FROM PROJECTION DATA OBTAINED FROM DIFFERENT GEOMETRIC ARRANGEMENTS

BACKGROUND OF THE INVENTION

1. Field of the Invention

The present disclosure relates to an image processing apparatus, image processing method, and non-transitory storage medium.

2. Description of the Related Art

Recently, X-ray imaging apparatuses have actively performed tomosynthesis to obtain a desired tomogram from projected images obtained by imaging a subject by irradiating the subject with X-rays from different angles while moving an X-ray tube. This method can obtain a tomogram in a short imaging time without requiring any large-scale apparatuses such as a CT apparatus. For this reason, this technique is high in patient throughput, and has attracted a great deal of attention as a low-exposure imaging technique.

In tomosynthesis, an X-ray imaging apparatus translates (or fixes) an X-ray detector while changing the X-ray irradiation angle in accordance with the characteristics of the apparatus and a necessary tomogram, thereby obtaining a plurality of X-ray images by imaging a subject at different projection angles. The apparatus then reconstructs these X-ray images to generate a tomogram.

In the field of CT, a reconstruction technique using filtered back projection is known as a technique of obtaining mathematically accurate tomograms. As a three-dimensional reconstruction technique using a cone beam, in particular, the Feldkamp method is known as disclosed in non-patent literature 1 (practical cone beam algorithm, L. A. Feldkamp, L. C. Davis, and J. W. Kress, J Opt Soc Am (1984)). This method can directly generate a tomogram by using projected images obtained while making a cone beam face an X-ray detector and rotating the X-ray detector around a subject.

If tomosynthesis reconstruction can be performed by using filtered back projection used in CT in this manner, it is possible to obtain high-contrast tomograms with less blur. However, the positional relationship (geometric arrangement) between an X-ray source and an X-ray detector in tomosynthesis differs from that in CT, and hence it is difficult to directly apply the image reconstruction algorithm used in CT to tomosynthesis. According to patent literature 1 (U.S. Pat. No. 6,256,370), as shown in FIG. 7, a virtual CT detector 7002 corresponding to a detector in cone beam CT imaging is set. This literature describes a method of reconstructing the images obtained by a detector 7001 for tomosynthesis using X-rays from an X-ray source 7000 using a CT reconstruction algorithm such as the above Feldkamp method after temporarily obtaining virtual projection data expected to be obtained by the virtual CT detector 7002.

As shown in FIG. 7, however, when the pixels obtained by the detector 7001, which are uniformly arranged in tomosynthesis, are geometrically transformed into the arrangement of the virtual CT detector 7002, the pixels are nonuniformly arranged. For this reason, pixel values are generated by interpolating the pixel values at the respective points with neighboring pixel values.

However, this interpolating operation corresponds to a spatial low-pass filter, and hence high-frequency information is lost at the time of this geometric transformation. As a result, the tomogram obtained by reconstruction using a cone beam CT algorithm decreases in spatial resolution.

In addition, the technique disclosed in patent literature 1 requires a memory space to geometrically transform a cone-beam CT image and hold the resultant image. Furthermore, the extra processes, namely geometric transformation and interpolation, prolong the processing time required for reconstruction in tomosynthesis whose merit lies in short processing time.

SUMMARY OF THE INVENTION

The present invention has been made in consideration of the above problems, and provides a technique of obtaining a tomogram by directly performing back projection without performing geometric transformation of projected images obtained by tomosynthesis into data for a virtual detector in cone beam CT. This provides a tomogram by tomosynthesis, which exhibits a high spatial resolution and low processing load.

According to one aspect of the present invention, there is provided an image processing apparatus which processes an image obtained by tomosynthesis shooting by using a radiation source and a two-dimensional detector, the apparatus comprising: an obtaining unit configured to obtain a plurality of projection data output from the two-dimensional detector upon tomosynthesis shooting; and a reconstruction unit configured to perform analytical reconstruction processing of a tomogram of a subject from the plurality of projection data obtained by tomosynthesis shooting without transforming the projection data into virtual projection data on a virtual CT detection plane virtually set to be perpendicular to a radiation center direction of the radiation source.

According to another aspect of the present invention, there is provided an image processing method of processing an image obtained by tomosynthesis shooting by using a radiation source and a two-dimensional detector, the method comprising: an obtaining step of obtaining a plurality of projection data output from the two-dimensional detector upon tomosynthesis shooting; and a reconstruction step of reconstructing a tomogram of a subject by performing analytical reconstruction processing using the projection data without transforming the plurality of projection data obtained by tomosynthesis shooting into virtual projection data on a CT detection plane virtually set to be perpendicular to an irradiation center direction of the radiation source.

Further features of the present invention will become apparent from the following description of exemplary embodiments (with reference to the attached drawings).

DESCRIPTION OF THE EMBODIMENTS

Embodiment

Figure 1:
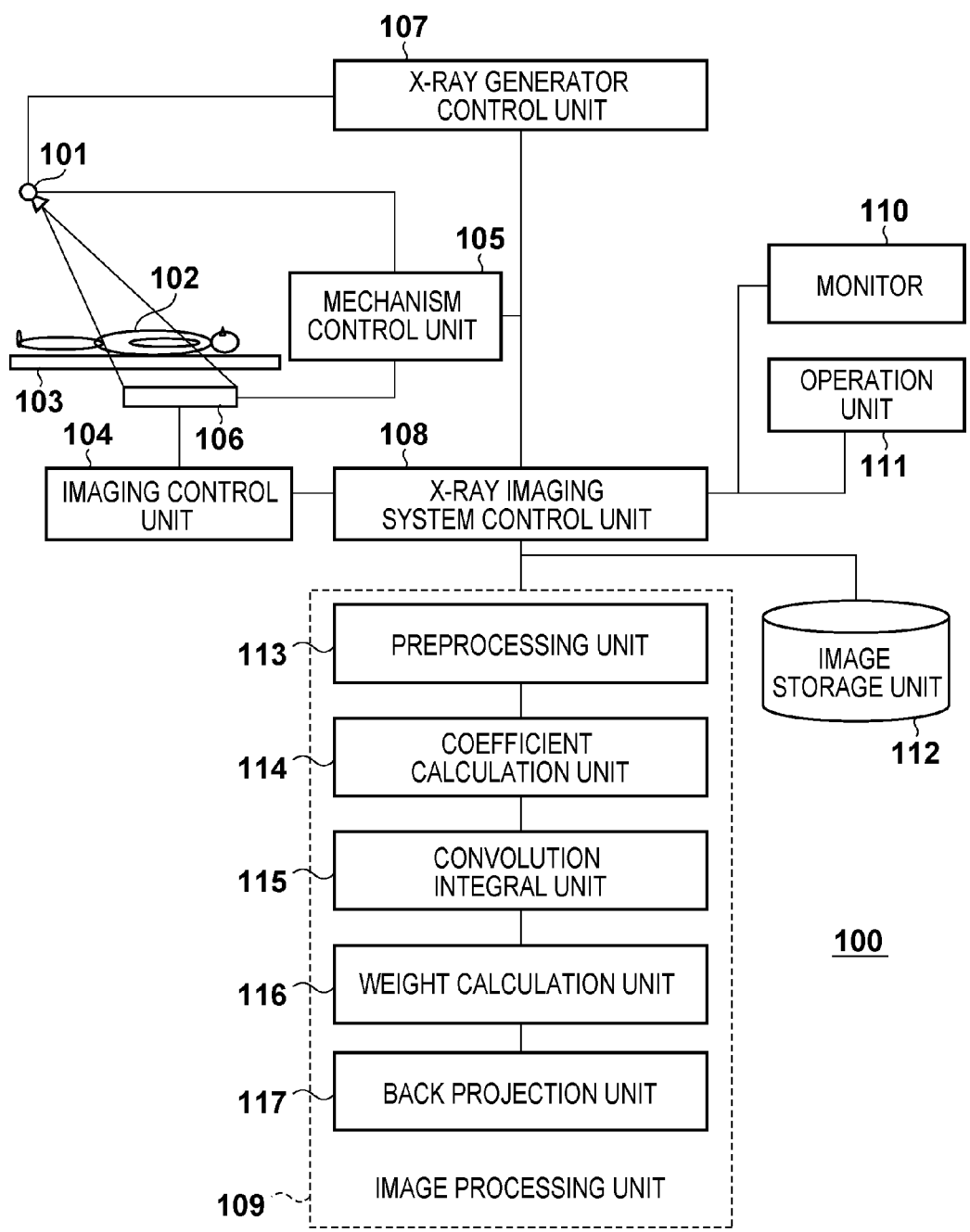
FIG. 1 is a block diagram exemplifying the functional arrangement of a tomogram diagnostic apparatus according to an embodiment of the present invention.

A tomogram diagnostic apparatus (image processing apparatus) and tomogram generation method according to an embodiment of the present invention will be described below with reference to the accompanying drawings. FIG. 1 is a block diagram showing the functional arrangement of the tomogram diagnostic apparatus according to the embodiment of the present invention. A tomogram diagnostic apparatus 100 includes an X-ray tube 101 which can apply X-rays in a cone beam form from a plurality of irradiation angles, a bed 103 on which a subject 102 is laid, and an X-ray detector 106 which obtains an X-ray image by receiving X-rays. In this case, the X-ray detector 106 is a two-dimensional detector having a two-dimensional imaging plane. The X-ray tube 101 and the X-ray detector 106 which detects X-rays applied from the X-ray tube are arranged to face each other through a subject. A mechanism control unit 105 controls the positions of the X-ray tube 101 and X-ray detector 106. The tomogram diagnostic apparatus 100 can perform tomosynthesis shooting in addition to simple imaging and long-length imaging. In this case, simple imaging is an imaging method of obtaining one X-ray image by irradiating the subject 102 with X-rays. Long-length imaging is an imaging method of imaging a large subject such as the whole body, whole spine, or entire lower extremity part by part by performing imaging operation a plurality of number of times. The mechanism control unit 105 performs imaging a plurality of number of times while moving the X-ray tube 101 and the X-ray detector along an imaging region. One subject image is obtained by concatenating the images obtained by long-length imaging. In tomosynthesis shooting, the apparatus translates at least one of the X-ray tube 101 and the X-ray detector 106 while changing the distance between the focal position of the X-ray tube 101 and the center position of the imaging plane of the X-ray detector 106. This is an imaging method of obtaining a plurality of projection data obtained by the X-ray detector 106, by causing the X-ray tube 101 to apply X-rays a plurality of number of times, in accordance with the respective irradiations. Moving the X-ray tube or the X-ray detector 106 will reconstruct a tomogram of an imaging region of the subject 102 from projection data.

An imaging control unit 104 electrically controls the X-ray detector 106 to obtain an X-ray image. An X-ray generator control unit 107 electrically controls the X-ray tube 101 to generate X-rays under a predetermined condition. An X-ray imaging system control unit 108 controls the mechanism control unit 105 and the imaging control unit 104 to obtain an X-ray image from a plurality of X-ray irradiation angles. This X-ray image is projection data of the imaging region of the subject 102. The X-ray imaging system control unit 108 further includes an image processing unit 109 and an image storage unit 112, and incorporates one or a plurality of information processing apparatuses (computers). Each computer includes, for example, a main control unit such as a CPU and storage units such as a ROM (Read Only Memory) and RAM (Random Access Memory). The computer may further include a graphic control unit such as GPU (Graphics Processing Unit), a communication unit such as a network card, and input/output units such as a keyboard, display, and touch panel. Note that these components are connected to each other via a bus, and are controlled by causing the main control unit to execute the programs stored in the storage unit.

The image processing unit 109 processes the images (projection data) obtained by tomosynthesis shooting using the X-ray tube 101 and the X-ray detector 106. The X-ray imaging system control unit 108 reconstructs the obtained X-ray images in accordance with an instruction from the X-ray imaging system control unit 108 to generate a tomogram. For this purpose, the image processing unit 109 includes a preprocessing unit 113, a coefficient calculation unit 114, a convolution integral unit 115, a weight calculation unit 116, and a back projection unit 117.

The preprocessing unit 113 receives a plurality of X-ray images (to be referred to as "projected images or projection data" hereinafter) obtained by the X-ray imaging system control unit 108 from the X-ray detector 106 at various X-ray irradiation angles via the imaging control unit 104. The projected images undergo defect correction, gain correction, and the like. The resultant images are logarithmically transformed (logarithmic transformation). This corrects X-ray irradiation irregularity and pixel defects caused by the X-ray detector 106 and the X-ray tube 101.

The coefficient calculation unit 114 calculates coefficients determined by the geometric arrangement between the detection points on the X-ray detector 106 and the X-ray tube 101. In this case, the geometric arrangement is the relative and physical positional relationship between the X-ray tube 101 and the X-ray detector 106 and, more specifically, the relationship between the position of the X-ray tube 101 and the positions of the respective pixels on the imaging plane of the X-ray detector 106. Since the geometric arrangement between the X-ray detector 106 and the X-ray tube 101 differs for each imaging operation, the coefficient corresponding to each pixel position differs for each X-ray irradiation.

The convolution integral unit 115 performs convolution integral between a filter function for reconstruction and the products of the coefficients calculated by the coefficient calculation unit 114 and the pixel values at the detection points on the X-ray detector 106. The convolution integral unit 115 performs this convolution integral on coordinate axes parallel to the detection plane of the X-ray detector 106. As the filter function for reconstruction, a ramp filter, Shepp & Logan filter, or the like, which is used for general reconstruction, may be used. This generates an image (filtered image) obtained by performing reconstruction filtering of the projected images.

The weight calculation unit 116 calculates weight coefficients determined by a geometric arrangement indicating the relative positional relationship between the reconstruction points of the weight calculation unit 116 and the X-ray tube 101. A reconstruction point is a point on three-dimensional coordinates having, as an origin, an isocenter indicating the position of a pixel of a projected image when generating projected images having undergone filter processing by reconstruction. The isocenter is a rotation center where a reference axis (beam center or irradiation center) intersects when the irradiation direction of the X-ray tube changes. The weight calculation unit 116 calculates weight coefficients from a geometric arrangement indicating the relative positional relationship between the X-ray tube and points on three-dimensional coordinates, which indicate the positions of the pixels of projected images having undergone filter processing, with a rotation center where a beam center intersects when the irradiation direction of the X-ray tube changes being an origin.

The back projection unit 117 performs back projection processing for the filtered image calculated by the convolution integral unit 115 while multiplying the image by the weights determined from the geometric arrangement of the reconstruction points calculated by the weight calculation unit 116 and the X-ray tube. With this operation, the back projection unit 117 can reconstruct a desired tomogram of a subject by performing reconstruction processing by filtered back projection. Note that weight multiplication is not essential to back projection processing. However, it is possible to perform weight multiplication to accurately perform reconstruction of a tomogram (projected images) of a subject. Specific coefficients and theoretical calculation formulas used for the reconstruction of a tomogram will be described later.

A general tomogram diagnostic apparatus such as a CT apparatus differs from the tomogram diagnostic apparatus 100 in that it captures a tomogram by using a general imaging apparatus or fluoroscopic apparatus. For this reason, the X-ray tube 101 performs imaging around the subject 102 at an angle smaller than 180°, for example, about ±40°, while the X-ray detector 106 slides in the horizontal direction or is fixed. This makes it possible to capture a tomogram by using a general imaging apparatus capable of changing the irradiation angle within a predetermined range without using a large-scale CT apparatus, and hence can greatly reduce the cost of a tomogram diagnostic apparatus. In addition, since it is possible to perform imaging in a short imaging time and in an open space, the load on a subject can be reduced.

Figure 2:
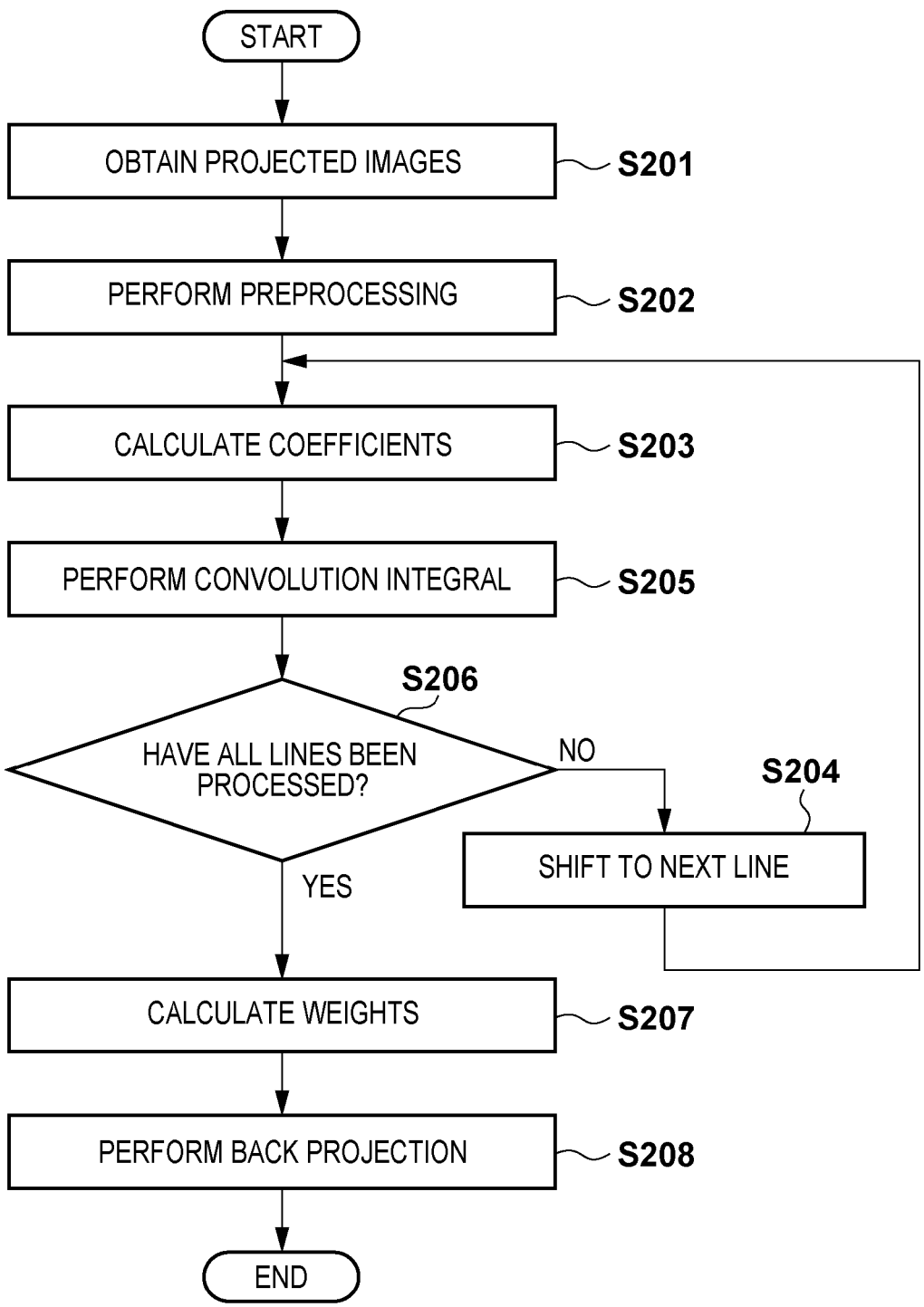
FIG. 2 is a flowchart showing an example of a procedure for tomogram generation processing according to an embodiment of the present invention.

An example of a procedure for tomogram generation processing in the tomogram diagnostic apparatus 100 shown in FIG. 1 will be described next with reference to FIG. 2. First of all, in step S201, the tomogram diagnostic apparatus 100 obtains projected images. The apparatus performs this operation by imaging the subject 102 with X-rays while changing the X-ray irradiation angle of the X-ray tube 101 from −40° to 40°. Although it is possible to capture an arbitrary number of images, the apparatus can acquire 80 projected images at 15 FPS in about six sec. Although it is possible to set arbitrary imaging conditions for X-rays, the apparatus may image the chest at about 100 kV and about 1 mAs. In addition, the distance between the X-ray detector 106 and the X-ray tube 101 is set to about 100 cm to 150 cm so as to fall within the set range of a fluoroscopic apparatus or general imaging apparatus.

The X-ray tube 101 can draw an arcuated orbit. However, it is difficult from a mechanical viewpoint for a fluoroscopic apparatus or general imaging apparatus to draw an arcuated orbit. In this case, the apparatus may perform imaging operation while moving the X-ray tube 101 in the longitudinal direction of the bed 103 and changing an X-ray irradiation angle β. The positional relationship between the X-ray irradiation angle at this time and the moved X-ray tube 101 is given by D tan β, where D is the distance between the focal point of the X-ray tube 101 and the isocenter when β=0.

The apparatus also translates the X-ray detector 106 relative to the X-ray tube 101. The amount of translation at this time is given by P tan β, where P is the distance between the isocenter and the center of the X-ray detector 106. Translating the X-ray detector 106 in this manner can make the reference axis always pass through the center of the X-ray detector 106 regardless of whether the X-ray irradiation direction of the X-ray tube 101 changes.

Some fluoroscopic apparatus or general imaging apparatus may not include any mechanism which translates the X-ray detector 106. In this case, making the isocenter coincide with a specific position, for example, the central position on the X-ray detector 106 can perform tomosynthesis shooting even without translating the X-ray detector 106 while the X-ray detector 106 is fixed. Note however that if there is no mechanism for moving the X-ray detector 106, the X-ray irradiation range protrudes from the X-ray detector 106 as the X-ray irradiation angle β increases. As a consequence, part of an effective field of view FOV is lost, resulting in a reduction in the range of a tomogram which can be reconstructed.

The series of projected images obtained in step S201 are input to the image processing unit 109. First of all, the apparatus performs preprocessing in step S202. In this case, the apparatus corrects defective pixels generated in the manufacturing process for the X-ray detector 106 and irradiation irregularity caused by the X-ray tube 101. These processes may be performed in the same manner as for those generally performed in an X-ray detector. In addition, the preprocessing unit performs logarithmic transformation (log transformation) indicated by mathematical expression (1):

$$-\log I \qquad (1)$$

where I is a pixel value of a projected image and log is natural logarithm. With this processing, an X-ray attenuation coefficient is added to a pixel value of a projected image. The apparatus reconstructs an X-ray image based on the additivity of this X-ray attenuation coefficient.

The coefficient calculation unit 114 calculates a coefficient determined by a geometric arrangement indicating the relative positional relationship between the X-ray tube 101 and the detection points on the X-ray detector 106 in step S203. More specifically, this coefficient is represented by $$\frac{D_t + x_t \sin\beta_t}{\sqrt{D_t^2 + 2x_t D_t \sin\beta_t + x_t^2}} \qquad (2)$$

for $$D_t = \sqrt{D^2 + z_t^2}$$

$$\sin\beta_t = \frac{D\sin\beta}{\sqrt{D^2 + z_t^2}}$$

Figure 3:
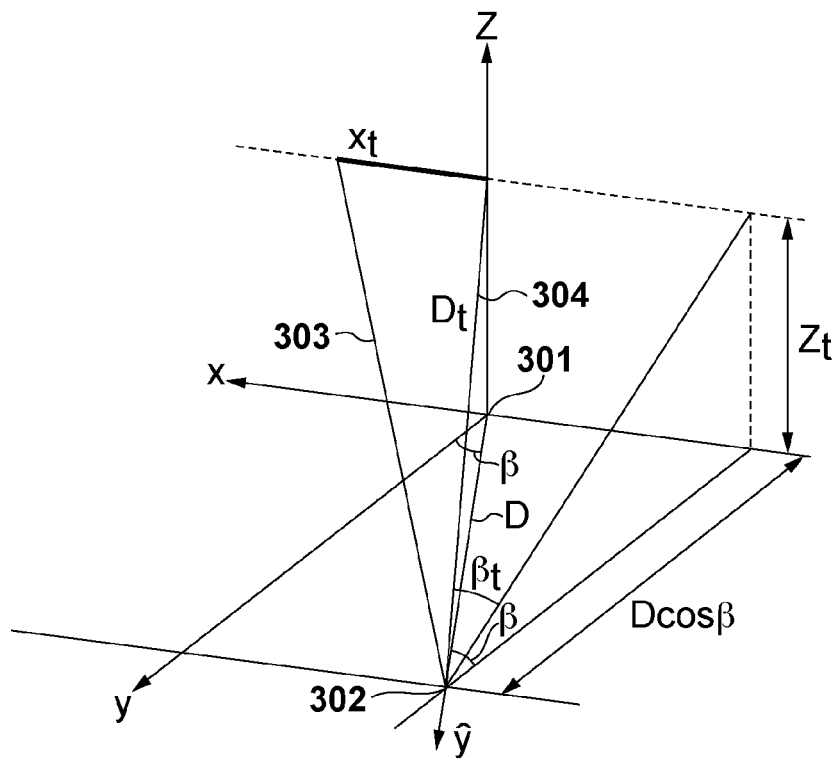
FIG. 3 is a view showing an example of convolution integral coordinates in the first embodiment.

The reconstruction coordinate system in FIG. 3 represents the relationship between the respective variables. Three-dimensional coordinates axes x, y, and z represent a reconstruction coordinate space having an isocenter as an origin. An x-z plane is a plane which is parallel to the detection plane of the X-ray detector 106 and passes through an isocenter 301. The y-axis is a normal perpendicular to the detection plane of the X-ray detector 106. Let $x_t$ and $z_t$ be the x- and z-coordinates of a point where a straight line 303 connecting a point on the X-ray detector 106 to a focal point 302 of the X-ray tube 101 intersects the x-z plane. An angle β defined by the y-axis and the reference axis of the X-ray tube 101 is an X-ray irradiation angle (projection angle). Mathematical expression (2) represents the cosine value of the angle defined by the straight line 303 and a straight line 304. The straight line 304 is a line connecting the focal point 302 to a point where a perpendicular line extending from a point where the straight line 303 intersects the x-z plane intersects the z-axis. Note that mathematical expression (2) specifically expresses a coefficient for the execution of the present invention. It is therefore possible to use other mathematical methods for the calculation of a coefficient equivalent to mathematical expression (2). That is, the present invention is not limited by the calculation using mathematical expression (2).

The convolution integral unit 115 performs filter processing by calculating the convolution integral between a filter function for reconstruction and the product of the coefficient given by mathematical expression (2) and a corresponding point on the X-ray detector 106. More specifically, equation (3) represents this calculation.

$$G(x'_t, z_t, \beta) = \int_{-\infty}^{\infty} q(x_t, z_t, \beta) h[x'_t - x_t] \frac{D_t + x_t \sin\beta_t}{\sqrt{D_t^2 + 2x_t D_t \sin\beta_t + x_t^2}} dx_t \quad (3)$$

where h[$x_t'-x_t$] is a reconstruction filter function such as a ramp filter or Shepp & Logan filter, and q($x_t,z_t,\beta$) indicates a corresponding point on the X-ray detector 106. The convolution integral in equation (3) represents a one-dimensional convolution integral on the coordinate axis $x_t$ parallel to the X-ray detector 106. Performing this convolution integral in step S205 within the detection plane (all the horizontal lines (or vertical lines)) of the X-ray detector 106 will obtain a two-dimensional filtered image G($x_t'$, $z_t$, $\beta$) as a projected image having undergone filter processing.

Figure 4:
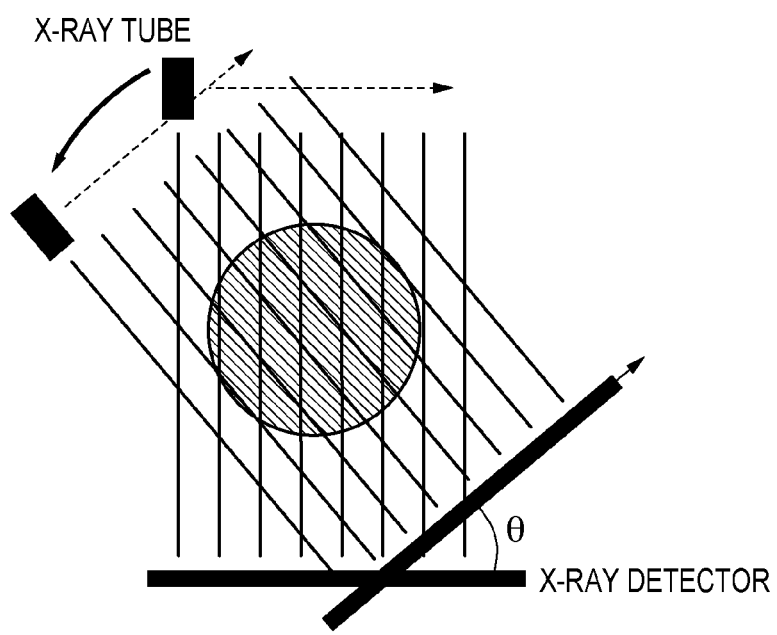
FIG. 4 is a view for exemplarily explaining two-dimensional reconstruction.
Figure 5A:
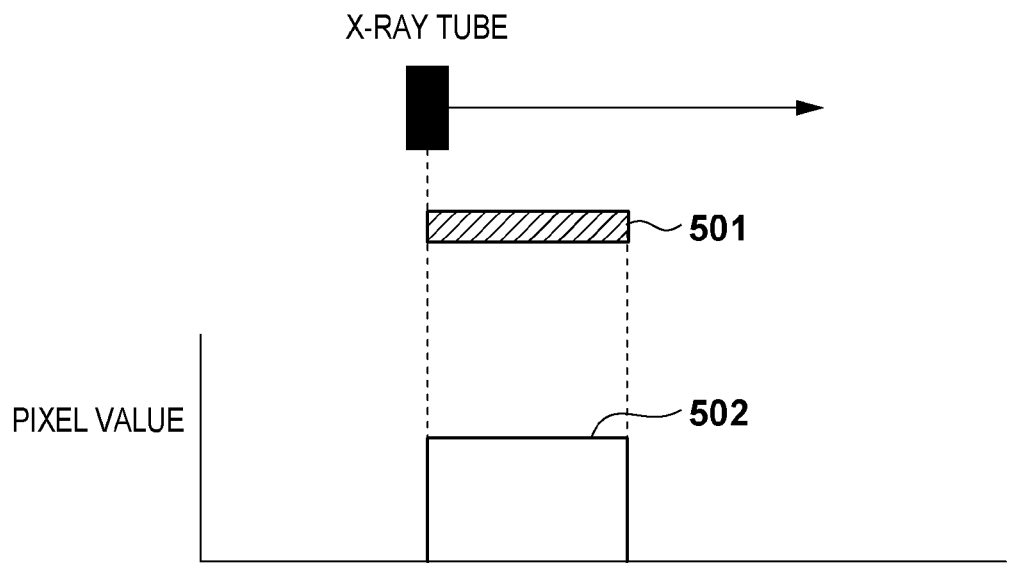
FIGS. 5A and 5B are graphs for exemplarily explaining two-dimensional reconstruction.

For an intuitive explanation of convolution integral processing represented by mathematical expression (2) and equation (3), two-dimensional reconstruction will be described with reference to FIGS. 4, 5A, and 5B. Normally, in order to perform mathematically strict reconstruction by filtered back projection, it is necessary to obtain projection data p(t', θ) on the t-axis by repeating parallel scanning while linearly collimating and rotating X-rays, as shown in FIG. 4. It is possible to reconstruct the projection data obtained in this manner by using equation (4):

$$f(x,y) = \int_0^\pi d\theta \int_{-\infty}^{\infty} p(t',\theta) h[t-t'] dt' \quad (4)$$

Equation (4) is obtained by equivalently transforming the Radon Transform as one form of a principle formula for CT reconstruction. In this case, h[t-t'] represents a filter function for reconstruction.

However, the above method repeatedly performs parallel scanning and fine rotation, and hence takes much time to obtain data, resulting in high radiation exposure on the subject. Nowadays, therefore, this technique is seldom used for medical X-ray CT.

Under the circumstances, it is popular nowadays to generate two-dimensional and three-dimensional tomograms by CT using a fan beam or cone beam without performing parallel scanning.

Reconstruction by filtered back projection using a fan beam or cone beam is performed upon transforming equation (4) in conformity with a fan beam or cone beam so as to allow direct reconstruction. The present invention therefore provides a technique of directly obtaining a tomogram by transforming equation (4) in conformity with tomosynthesis like a fan beam or cone beam without performing geometric transformation to cone beam CT and accompanying interpolation processing as in patent literature 1.

Equation (3) proposed in this embodiment is the form obtained by multiplying the projection data given by equation (4) by mathematical expression (2) and replacing a convolution integral axis t' with $x_t$. As described above, mathematical expression (2) represents the cosine value of the angle defined by the straight lines 303 and 304. FIG. 5A allows to intuitively understand this. A subject 501 in FIG. 5A has a thickness of 1 and an X-ray attenuation coefficient α. Scanning this subject with parallel beams as shown in FIG. 4 will obtain a uniform distribution like a projected image 502. Equation (5) represents the attenuation of X-rays within a substance. Performing logarithmic transformation (log transformation) represented by equation (1) can obtain the distribution of attenuation coefficients.

$$I = e^{-\alpha} \quad (5)$$

Figure 5B:
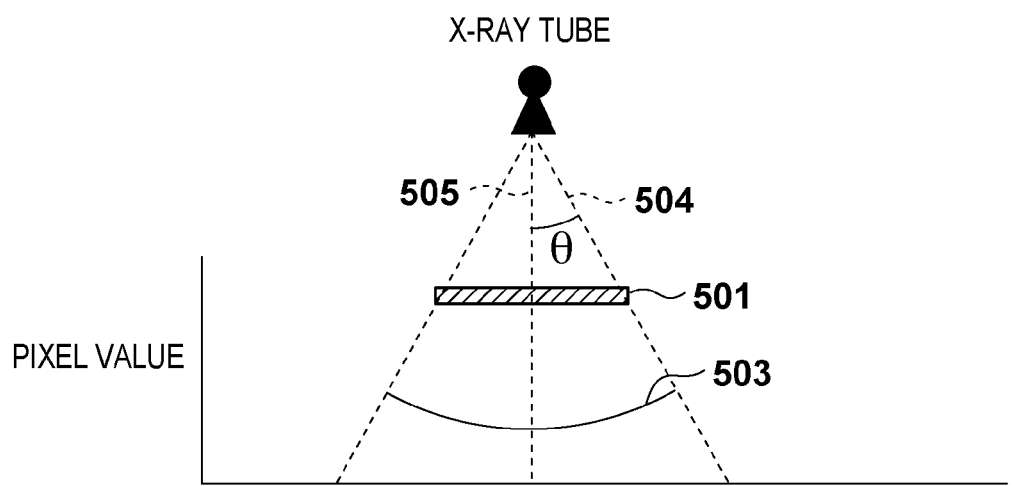

On the other hand, as shown in FIG. 5B, the projected images obtained by using a fan beam including rays which are not parallel exhibits an arcuated distribution as indicated by reference numeral 503. This is because a peripheral beam 504 passes through the subject 501 along a path longer than that of a central beam 505 by 1/cos φ. Therefore, the attenuation of X-rays in the substance is given by $$I = e^{-\frac{\alpha}{\cos\phi}} \quad (6)$$

Obviously from this equation, it is possible to obtain a proper distribution of attenuation coefficients by performing logarithmic transformation (log transformation) represented by equation (1) first, and then multiplying the resultant data by cos φ. FIG. 5B shows a simple example using a fan beam to show an intuitive representation. A similar idea holds for processing using a cone beam or tomosynthesis. In practice, in the process of transforming equation (4) into a form suitable for direct reconstruction in tomosynthesis, equation (3) (where zt=0) is mathematically derived.

Although the above description has been made on the two-dimensional CT reconstruction theory obtained from the two-dimensional Radon Transform and the transformation of the theory into the tomosynthesis reconstruction algorithm, the extension of the algorithm into a three-dimensional algorithm can obtain a tomosynthesis reconstruction formula. It is possible to perform extension to a three-dimensional algorithm in accordance with the three-dimensional Radon Transform based on the theory or by deriving a three-dimensional formula from a two-dimensional formula with a cone beam being considered as a set of a plurality of fan beams like the Feldkamp's cone beam CT reconstruction algorithm.

If the apparatus has not processed all the lines in steps S203 and S205 (NO in step S206), the process advances to processing for the next line (S204) to execute coefficient calculation processing (S203) and convolution integral processing (S205) until these processes are applied to all the lines. Applying coefficient calculation (S203) and convolution integral (S205) to all the lines (YES in step S206) will obtain a two-dimensional filtered image G($x_t'$, $z_t$, $\beta$).

It is possible to obtain a tomogram by performing back projection in step S208 for the two-dimensional filtered image G($x_t'$, $z_t$, $\beta$) obtained by applying the processes in steps S203 and S205 to all the lines. The apparatus performs back projection in step S208 while multiplying the filtered image by the weight calculated in step S207. In step S207, the apparatus calculates a weight coefficient. This weight is determined by the tomosynthesis geometric arrangement of reconstruction points and the X-ray tube, and is specifically represented by mathematical expression (7):

$$\frac{D\cos\beta}{\sqrt{D^2\cos^2\beta + z_t^2}} \frac{(D_t + x_t'\sin\beta_t)^2}{\cos\beta_t \left(D_t - \frac{D_t}{D}\vec{r}\cdot\hat{y}\right)^2} \quad (7)$$

Figure 6:
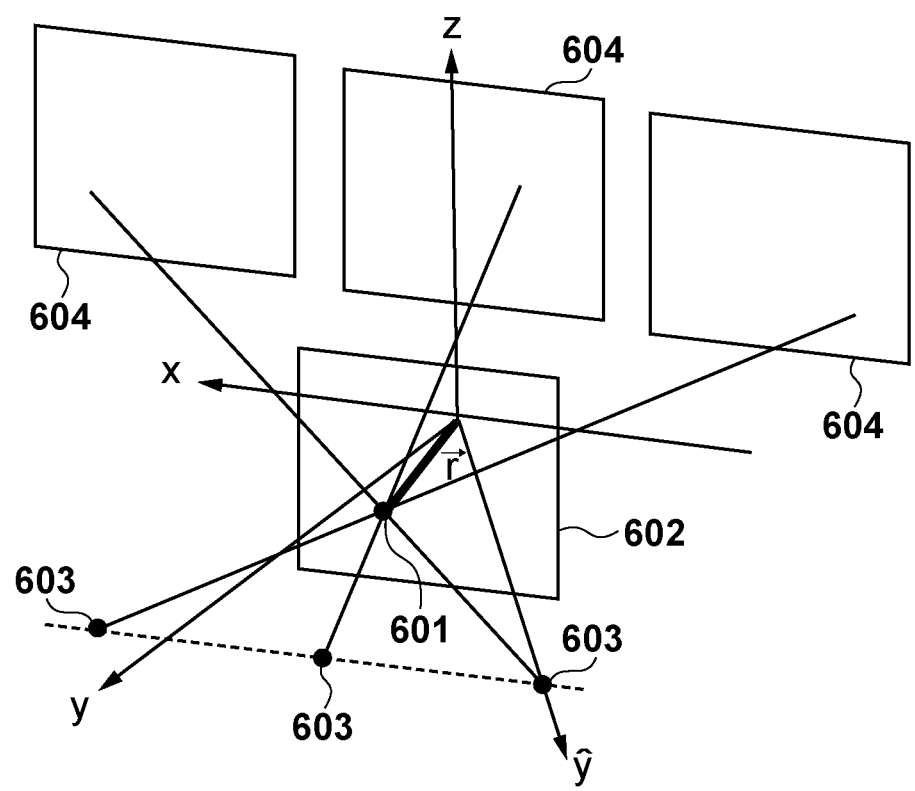
FIG. 6 is a view showing an example of back projection coordinates in the first embodiment.
Figure 7:
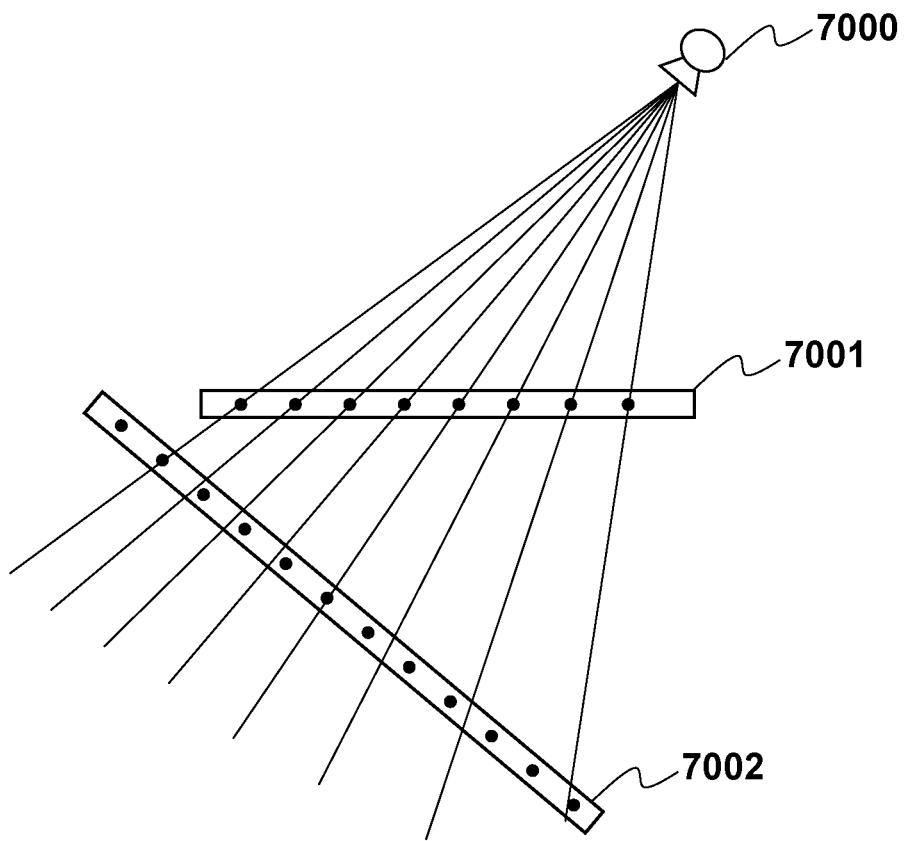
FIG. 7 is a view showing problems in the prior art.

FIG. 6 is a schematic view of back projection processing. Reference numeral 602 denotes a tomogram generated by tomosynthesis reconstruction. Reference symbol $\vec{\gamma}$ denotes a three-dimensional vector indicating a reconstruction point 601 on the tomogram 602 having an isocenter as an origin. Reference numeral 603 denotes the focal point of the X-ray tube which translates; and 604, an X-ray detector which moves together with the focal point 603. Reference symbol $\hat{y}$ denotes a unit vector along the reference axis (beam center) of the X-ray tube. The multiplication of the weight coefficient calculated by mathematical expression (7) at the time of back projection will obtain a reconstruction formula associated with the X-ray irradiation angle β of the X-ray tube 101 and the coordinate axis $x_t$ parallel to the detection plane of the X-ray detector 106 which is translated (or fixed). This makes it possible to perform direct reconstruction from tomosynthesis image data.

Finally, it is possible to implement tomosynthesis direct reconstruction by performing back projection in step S208, thereby obtaining a tomogram. In back projection in step S208, the apparatus performs integration within the irradiation angle range of the X-ray tube while multiplying a corresponding pixel value of the filtered image by the weight calculated by mathematical expression (7). More specifically, this operation is represented by $$f(\vec{r}) = \int_{-\beta_m}^{\beta_m} d\beta \frac{D\cos\beta}{\sqrt{D^2\cos^2\beta + z_t^2}} \frac{(D_t + x_t'\sin\beta_t)^2}{\cos\beta_t\left(D_t - \frac{D_t}{D}\vec{r}\cdot\hat{y}\right)^2} G(x_t', z_t, \beta) \quad (8)$$

where β$m$ is the maximum X-ray irradiation angle, −β$m$ is the minimum irradiation angle, and f($\vec{\gamma}$) is a pixel value of a tomogram. That is, the apparatus performs tomosynthesis back projection by summating pixel values at points where straight lines connecting tomogram positions $\vec{\gamma}$ and the focal point 603 of the X-ray tube intersect the X-ray detector 604 with respect to all the projection angles β. Note however that the pixel values obtained by the X-ray detector 604 are those having undergone filtering by equation (3) in step S205. The apparatus performs this summation while multiplying each pixel value by the weight decided by a tomosynthesis geometric arrangement calculated by equation (7) in step S207.

This equation is an equation for reconstructing projection data based on a reconstruction algorithm obtained by transforming the filter convolution axis in the Feldkamp's cone beam CT reconstruction algorithm into the axis of a plane parallel to the two-dimensional detector. This equation is also an equation for directly reconstructing a pixel value at each reconstruction point from a plane parallel to the X-ray detector 106. The equation is designed to directly apply a reconstruction algorithm to the projection data obtained by the X-ray detector 106 without interpolation processing. This makes it possible to directly perform tomosynthesis reconstruction without performing geometric transformation to a cone beam CT geometric arrangement and accompanying interpolation as described in patent literature 1.

Equation (8) is designed to perform back projection processing while multiplying a filtered image G obtained by equation (3) by the coefficient decided by a tomosynthesis geometric arrangement. Using equation (8) a tomogram can be obtained by directly reconstructing actual projection data without obtaining virtual projection data from a virtual CT detector by transforming the projection data obtained by an actual detector as described in patent literature 1. When, for example, performing tomosynthesis shooting for a chest region as an imaging region, it is possible to image a structure located deep in the breastbone which is difficult to check by general imaging operation. This makes it possible to perform reconstruction without performing interpolation processing by adding adjacent pixels upon transformation, thereby obtaining a tomogram whose image quality is improved while an increase in processing load is suppressed.

According to the present invention, it is possible to obtain a tomogram by directly performing filtered back projection without performing geometric transformation of the projected images obtained by tomosynthesis into a cone beam CT arrangement. This makes it possible to provide a tomogram by tomosynthesis with a higher spatial resolution in a shorter processing time than the prior art.

The typical embodiment of the present invention has been described above. However, the present invention is not limited to the embodiment described above and shown in the accompanying drawings, and can be modified and executed as needed within the spirit and scope of the invention. For example, the present invention can take embodiments as a system, apparatus, method, program, storage medium, and the like. More specifically, the present invention can be applied to a system including a plurality of devices, or to an apparatus including a single device.

Note that this apparatus may additionally include a display unit which displays an obtained tomogram and a display control unit in addition to the components exemplified above.

According to the above example, the apparatus performs calculation based on theoretical equation (8). Obviously, however, it is possible to perform discretization based on theoretical equation (8) accompanying processing by a digital computer. In this case, according to equation (3), filter synthesis processing is convolution computation. Note that when a digital computer processes a formula other than equation (8), errors due to calculation processing using digital values and approximation errors due to calculation amounts and other reasons are permitted.

In the above case, the image processing unit 109 performs reconstruction processing. However, a single image processing apparatus may execute this processing or a system constituted by a plurality of apparatuses may perform the processing with distributed functions.

In the above case, the apparatus uses the X-ray source for generating X-rays in a cone beam form. However, the present invention is not limited to this, and X-rays may be formed into a quadrangular pyramid depending on the shape of a stop.

The above case has exemplified X-ray imaging. However, the present invention can be applied to other types of radiography. The reconstruction process disclosed above is one of the techniques of analytical reconstruction process.

As described above, according to the above embodiment, the preprocessing unit 113 or obtaining unit (not shown) of the image processing unit 109 obtains a plurality of projection data which the two-dimensional detector output upon tomosynthesis shooting. The reconstruction processing unit constituted by the coefficient calculation unit 114, convolution integral unit 115, weight calculation unit 116, and back projection unit 117 (back projection processing unit) reconstructs a tomogram of a subject by performing back projection processing without transforming a plurality of projection data obtained by tomosynthesis shooting into virtual projection data on a virtual CT detection plane which is virtually set to be perpendicular to the irradiation center direction of the X-ray tube 101.

This makes it possible to directly perform reconstruction without performing interpolation processing by adding adjacent pixels upon transformation, thereby obtaining a tomogram whose image quality is improved while an increase in processing load is suppressed.

The convolution integral unit 115 also synthesizes a reconstruction filter with the above projection data. The back projection unit 117 performs back projection processing. This can obtain a tomogram by directly performing filtered back projection without performing geometric transformation of the projected images obtained by tomosynthesis into a cone beam CT arrangement. This makes it possible to provide a tomogram by tomosynthesis with a higher spatial resolution in a shorter processing time than the prior art.

Since a reconstruction formula obtained by transforming a theoretical formula such as the Feldkamp method is used, it is possible to directly use a ramp filter, a Shepp & Logan filter, or another reconstruction filter used for reconstruction by CT shooting. Obviously, it is also possible to use a filter for tomosynthesis in consideration of a shortage of irradiation angle accompanying tomosynthesis shooting.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-260367, filed Nov. 22, 2010, and No. 2011-234148, filed Oct. 25, 2011, which are hereby incorporated by reference herein in their entirety.

What is claimed is:

1. An image processing apparatus for performing tomosynthesis from a plurality of projection data, the apparatus comprising:
   an obtaining unit configured to obtain projection images, from a digital detector, shot in different geometric arrangements of the digital detector and a radiation source for irradiating a two-dimensional area of the detector at one shot for obtaining each of the projection images, wherein each of the geometric arrangements is different in an angle between a line perpendicular to a detection plane of the digital detector and a reference axis of the radiation source;
   a reconstruction unit configured to reconstruct a tomogram by performing back projection processing on filtered projection images obtained by filtering the obtained projection images with a reconstruction filter,
   wherein said reconstruction unit is configured to weight the obtained projection images using coefficients each representing a three-dimensional positional relationship between the radiation source and each pixel in each of the obtained projection images, in the geometric arrangement for each of the obtained projection images.

2. The apparatus according to claim 1, wherein said reconstruction unit performs back projection processing by synthesizing a reconstruction filter with the projection data.

3. The apparatus according to claim 1, wherein said reconstruction unit performs reconstruction processing based on an arrangement relationship between the radiation source and a position on the digital detector which corresponds to each pixel value of the plurality of projection data.

4. The apparatus according to claim 3, wherein said reconstruction unit performs back projection processing based on the arrangement relationship between the plurality of projection data and a reconstruction filter.

5. The apparatus according to claim 4, wherein said reconstruction unit performs back projection processing by synthesizing the reconstruction filter with the projection data while multiplying a first coefficient determined by the arrangement relationship, and multiplying the synthesized data by a second coefficient determined by the arrangement relationship.

6. The apparatus according to claim 1, wherein said reconstruction unit performs no processing of interpolating a virtual pixel in a virtual detector by adding pixel values at positions near the projection data, which processing is performed due to projection of the virtual detector onto a coordinate system.

7. The apparatus according to claim 1, wherein said reconstruction unit directly applies a reconstruction algorithm to projection data obtained by the two dimensional digital detector.

8. The apparatus according to claim 1, wherein said reconstruction unit directly reconstructs a pixel value at each reconstruction point from a plane parallel to the digital detector.

9. The apparatus according to claim 1, wherein said reconstruction unit reconstructs the projection data based on a reconstruction algorithm obtained by transforming a filter convolution axis in a Feldkamp's cone beam CT reconstruction algorithm into an axis of a plane parallel to the digital detector.

10. The apparatus according to claim 1, wherein tomosynthesis shooting is imaging performed by the radiation source and the digital detector, which is a two-dimensional detector having a two-dimensional imaging plane, and is an imaging method of causing the radiation source to apply radiation a plurality of number of times while changing a distance between a focal position of the radiation source and a central position of the imaging plane and moving at least one of the radiation source and the two-dimensional detector, and obtaining a plurality of projection data obtained by the two-dimensional detector in accordance with the respective irradiations.

11. The apparatus according to claim 1, further comprising a display control unit configured to cause a display unit to display the reconstructed tomogram of the subject.

12. The apparatus according to claim 1, further comprising a computation unit configured to perform computation based on an equation given below:

$$f(\vec{r}) = \int_{-\beta_m}^{\beta_m} d\beta \frac{D\cos\beta}{\sqrt{D^2\cos^2\beta + z_t^2}} \frac{(D_t + x_t'\sin\beta_t)^2}{\cos\beta_t \left(D_t - \frac{D_t}{D}\vec{r}\cdot\hat{y}\right)^2} G(x_t', z_t, \beta).$$

13. The apparatus according to claim 12, wherein said computation unit performs computation by discretizing the equation.

14. The apparatus according to claim 1,
   wherein said reconstruction unit is configured to obtain each of the coefficients which is a cosine value of an angle between a first line and a second line,
   wherein the first line connects a first point corresponding to the radiation source to a second point in a first plane, corresponding to each of the obtained projection images,
   the first plane being parallel to the detection plane and including an isocenter of the geometric arrangements, and wherein the second line connects the first point and a third point which is a projection point onto a second plane, the second plane being perpendicular to the first plane and including the isocenter.

15. The apparatus according to claim 1, wherein said reconstruction means is configured to obtain each of the coefficients which is derived based on an angle $\beta_t$ defined as:

$$\beta_t = \arcsin(D \sin \beta/(D^2+z_t^2)^{1/2})$$

wherein three-dimensional coordinates are defined by an isocenter as an origin, and an x-axis and a z-axis being parallel to the detection plane, the x-axis being along a moving direction of the detection plane, and a y-axis being a normal direction to the detection plane, and wherein D is a distance between a focal point of the radiation source and the isocenter, and wherein an angle $\beta$ is defined by a yz-plane and a line between the focal point of the radiation source and the isocenter, and $(x_t, 0, z_t)$ is an intersection which is defined by an xz-plane and a line between the radiation source and a point on the detection plane.

16. The apparatus according to claim 1, further comprising an acquisition unit configured to acquire the coefficients indicating the positional relationships when the respective projection data are captured by the digital detector.

17. The apparatus according to claim 1, further comprising:
a filtering unit configured to filter the projection data with a reconstruction filter; and
a modifying unit configured to modify the projection data with other coefficients indicating positional relationships between the detector and the radiation source corresponding to the respective projection data,
wherein said filtering unit is configured to filter the modified projection data.

18. The apparatus according to claim 17, wherein said filtering unit performs a convolution operation of the projection data with the reconstruction filter.

19. An image processing method of performing tomosynthesis from a plurality of projection data, the method comprising:
an obtaining step of obtaining projection images, from a digital detector, shot in different geometric arrangements of the digital detector and a radiation source for irradiating a two-dimensional area of the detector at one shot for obtaining each of the projection images, wherein each of the geometric arrangements being different in an angle between a line perpendicular to a detection plane of the digital detector and a reference axis of the radiation source;
a reconstruction step of reconstructing a tomogram by performing back projection processing on filtered projection images obtained by filtering the obtained projection images with a reconstruction filter,
wherein said reconstruction step includes weighting the obtained projection images using coefficients each representing a three-dimensional positional relationship between the radiation source and each pixel in each of the obtained projection images, in the geometric arrangement for each of the obtained projection images.

20. The method according to claim 19, wherein, in said reconstruction step, back projection processing is performed by synthesizing a reconstruction filter with the projection data.

21. The method according to claim 14, wherein, in said reconstruction step, reconstruction processing is performed by using a reconstruction algorithm obtained by transforming a synthesis axis between the projection data and a reconstruction filter in a Feldkamp's cone beam reconstruction algorithm into an axis parallel to the detector.

22. A non-transitory computer-readable storage medium storing a program for causing a computer to execute an image processing method of performing tomosynthesis from a plurality of projection data, the image processing method comprising:
an obtaining step of obtaining projection images, from a digital detector, shot in different geometric arrangements of the digital detector and a radiation source for irradiating a two-dimensional area of the detector at one shot for obtaining each of the projection images, wherein each of the geometric arrangements is different in an angle between a line perpendicular to a detection plane of the digital detector and a reference axis of the radiation source;
a reconstruction step of reconstructing a tomogram by performing back projection processing on filtered projection images obtained by filtering obtained projection images with a reconstruction filter,
wherein said reconstruction step includes weighting the obtained projection images using coefficients each representing a three-dimensional positional relationship between the radiation source and each pixel in each of the obtained projection images, in the geometric arrangement for each of the obtained projection images.

* * * * *